US010390417B2

(12) United States Patent
Brezni et al.

(10) Patent No.: US 10,390,417 B2
(45) Date of Patent: Aug. 20, 2019

(54) PLASMA TORCH

(71) Applicant: Glass Expansion Pty. Limited, Port Melbourne, Victoria (AU)

(72) Inventors: Danny Brezni, Port Melbourne (AU); Jost E. Kaiser, Port Melbourne (AU); David J. Sultana, Craigieburn (AU)

(73) Assignee: Glass Expansion PTY. Limited, Port Melbourne (AU)

(*) Notice: Subject to any disclaimer, the term of this patent is extended or adjusted under 35 U.S.C. 154(b) by 0 days.

(21) Appl. No.: 15/836,544

(22) Filed: Dec. 8, 2017

(65) Prior Publication Data
US 2018/0168023 A1 Jun. 14, 2018

(30) Foreign Application Priority Data
Dec. 9, 2016 (AU) ................................ 2016905103

(51) Int. Cl.
| | | |
|---|---|---|
| *B23K 10/00* | (2006.01) | |
| *H05H 1/34* | (2006.01) | |
| *H05H 1/30* | (2006.01) | |
| *H05H 1/00* | (2006.01) | |

(52) U.S. Cl.
CPC ............ *H05H 1/34* (2013.01); *H05H 1/0037* (2013.01); *H05H 1/30* (2013.01); *B23K 10/00* (2013.01); *H05H 2001/3478* (2013.01)

(58) Field of Classification Search
CPC .......... H05H 1/34; H05H 1/0037; H05H 1/30; H05H 2001/3478; B23K 10/00
USPC ....... 219/121, 48, 121.5, 121.51, 75, 121.49
See application file for complete search history.

(56) References Cited

U.S. PATENT DOCUMENTS

| | | | | |
|---|---|---|---|---|
| 7,847,210 | B2 * | 12/2010 | Brezni ............... | H05H 1/30 |
| | | | | 219/121.36 |
| 8,622,735 | B2 * | 1/2014 | Morrisroe ........... | F23C 99/001 |
| | | | | 219/121.36 |

FOREIGN PATENT DOCUMENTS

| | | |
|---|---|---|
| EP | 2008670 A1 | 12/2008 |
| JP | 2014 063721 A | 4/2014 |
| WO | WO 03/069964 A1 | 8/2003 |

OTHER PUBLICATIONS

Extended European Search Report for Application No. 17206302.6, dated Apr. 6, 2018 in 10 pgs.

* cited by examiner

*Primary Examiner* — Mark H Paschall
(74) *Attorney, Agent, or Firm* — Knobbe, Martens, Olson & Bear, LLP (57) ABSTRACT

Disclosed is a demountable tube for a plasma torch assembly, such as an ICP torch assembly. The tube includes an open tubular body for radially surrounding a plasma within the tubular body. The tubular body may comprise a wall; and a mounting feature projecting from the tubular body for at least one of: (i) controlling alignment of the tubular body with respect to a mounting portion of the torch assembly, and (ii) releasably securing the tubular body to a portion of the torch assembly. The tubular body may also have a transmission zone that is partially devoid of said wall and includes at least one hole through said wall. The tube may be opaque. A plasma torch and ICP spectroscopy system are also disclosed.

20 Claims, 10 Drawing Sheets

PLASMA TORCH

FIELD OF THE INVENTION

The present invention relates to plasma torches, for example Inductively Coupled Plasma (ICP) torches, and a demountable tube for such torches.

BACKGROUND OF THE INVENTION

Plasma torches are important for a different of types of elemental analysis. Inductively Coupled Plasma (ICP) torches torches are an integral part of ICP analytical systems that perform mass spectrometry (MS) or optical emission spectroscopy (OES).

ICP torches commonly include three concentric tubes including an inner, sample tube for delivering an aerosol sample to the plasma within the torch; a middle, plasma tube (which is frequently flared) for delivering the plasma gas; and an outer, coolant tube for delivering a coolant gas. The outer tube of the ICP torch has a plasma surrounding portion that distally extends beyond the distal tips of the respective middle and inner tubes. Gas flow through the sample and plasma tubes are axial, but the flow through the coolant tube follows a helical path along the inside annulus of the tube.

The three tubes are typically in concentric alignment over a length of 5-20 centimeters, and the required tolerance is very fine. As a result ICP torches have conventionally been formed using three tubes fused at one end to fix the tolerances required for consistent operation.

In use, the ICP torch is mounted in a box/cavity within the spectroscopy equipment. The box includes an RF coil, which surrounds the plasma surrounding portion of the outer tube, to supply sufficient energy to sustain the plasma.

To ignite (seed) the plasma a Tesla coil provides spark at a side of the coolant (outer) tube, at a location that is more proximally located (with respect to the base of the torch) than the plasma surrounding portion of the outer tube. At that location, a cross section through the torch includes both the outer and middle tubes (and generally the inner tube as well). The spark is transmitted through the outer tube, from where electrons from the spark travel helically and distally along the tube to seed the generation of the plasma.

A torch in which the tubes are fused is difficult to clean or repair, for example when the sample tube is contaminated or when the coolant tube undergoes melt-down. Therefore demountable torches have been designed to enable at least the outer tube to be removably mounted to a part of the torch assembly.

U.S. Pat. No. 7,847,210 B2 (Brezni et al.) dated 7 Dec. 2010, the entirety of which is incorporate herein by reference, describes torches in which the outer tube has a tubular body and a mounting feature projecting from the tubular body for controlling alignment of the tubular body to a base portion of the torch assembly. In some embodiments, the mounting feature also releasably secures the tubular body to the base portion of the torch assembly, while in other embodiments a further part is used to releasably hold the mounting feature to the base portion to thereby secure the tubular body in the torch assembly. In various embodiments the mounting feature includes a tapered surface to control the alignment, the tapered surface being on a collar that is integral with the outer tube at a proximal end of the outer tube.

Standard ICP torches have transparent outer, middle and inner tubes, each comprised of quartz. The transparency of the outer tube allows light emitted from the plasma to be detected by a light sensor in the box. If the light level that is incident upon the sensor is below a certain threshold, the spectrometer will determine that there is no plasma present. Thus if a plasma is expected but is not present, appropriate action may be taken by the spectroscopy equipment, for example the equipment may notify or alert an operator. The transparency of the outer tube also enables the plasma within the torch to be seen by the operator from a side-on view of the torch, through a viewing window in the box that houses the torch. Thus the operator may visually verify whether the plasma is present and/or observe the plasma for diagnostic or other purposes.

However, the plasma can reach temperatures in excess of 6000° C., which is well above the melting point of quartz, which is in the order of 1700° C. (more specifically about 1670° C.). To provide some protection against damage to the tubes (the outer and middle tubes in particular), a coolant gas (typically Argon) is supplied via the outer tube, and over the middle tube, to cool the outer tube. However, a significant flow rate of gas is required to achieve sufficient cooling and this can be financially costly. Even still, the such quartz tubes may need to be replaced as often as once a week, depending on the specific application and amount of use.

To improve the longevity of ICP torches and/or to reduce the amount of required coolant gas, the tubes of the ICP torch are made to have a higher melting point than that of quartz. However, such materials, such as many ceramics, may be opaque, thus hiding the plasma from the operator and from the light sensor in the torch box.

Also, in the case of quartz tubes, the spark transmits relatively well through the tubes, but some ceramic tubes have a higher impedance against such transmission. This can result in the ignition of the plasma being less consistent in the case of such ceramic tubes. To reduce the outer tube's impedance to spark transmission, some of such ceramic outer tubes include a circular hole in the ceramic wall of the tube, at the termination of the tesla coil. To avoid leakage of coolant gas though the hole, a copper or other low impedance material is patched over the hole. However, this adds a part to the torch assembly and may be considered visually unsatisfactory for some users.

The present invention provides an ICP plasma torch or a component for such a torch that addresses at least one of these or other problems of the prior art.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

A first aspect of the present invention provides a demountable tube for a plasma torch assembly, such as an ICP torch assembly, the tube comprising:
  an open tubular body for radially surrounding a plasma within the tubular body, the tubular body comprising a wall; and
  and a mounting feature projecting from the tubular body for at least one of: (i) controlling alignment of the tubular body with respect to a mounting portion of the torch assembly, (ii) and releasably securing the tubular body to a portion of the torch assembly;
  wherein the tubular body has a transmission zone that is partially devoid of said wall and includes at least one hole through said wall.

In some embodiments, the transmission zone includes only a single hole, wherein said hole is shaped so that the transmission zone is partially devoid of said wall. The hole may define at least one elongate opening in the wall.

A second aspect of the present invention provides a demountable tube for a plasma torch assembly, such as an ICP torch assembly, the tube comprising:
- an open tubular body for radially surrounding a plasma within the tubular body, the tubular body comprising a wall; and
- and a mounting feature projecting from the tubular body for at least one of: (i) controlling alignment of the tubular body with respect to a mounting portion of the torch assembly, (ii) and releasably securing the tubular body to a portion of the torch assembly;
- wherein the tubular body includes a region that has either (i) a plurality of holes through the wall; or (ii) a single hole through the wall, wherein the single hole is either a complex hole or defines at least one elongate opening in the wall.

The region may define a transmission zone that is partially devoid of said wall.

The following embodiments and features can be applied to either of the above aspects of the invention.

In an embodiment, said portion of the torch assembly to which the tubular body may be releasably secured is the mounting portion of the torch assembly.

Preferably the transmission zone covers an area devoid of wall such that between 1% and 90% of the wall is open, ie devoid of the wall, by virtue of the at least one hole. More preferably the area is between 1% and 75% open, and more preferably between 1% and 50% open, and yet more preferably between 1% and 30% open, and still more preferably between 5% and 30% open.

In an embodiment the transmission zone is partially devoid of said wall by including a plurality of holes. The plurality of holes may be of any shape or combination of shapes. However, in one embodiment each the holes is circular. In one example of this embodiment, the transmission zone covers an area that is between 5 and 10% open, eg 8% open. For example, the holes may have a diameter of 0.1 mm and may have 169 holes spread over a circular area having a diameter of 4.5 mm. In another example of this embodiment, there the holes have a diameters of 0.4 mm, with the hole spaced so that transmission zone is about 15% open, eg 14% open. In another embodiment each of the holes are slot shaped. Each of the slot shaped holes may be linear slots. Such slots may have a width of 0.3 mm and be spaced so that the transmission zone is about 30% open, eg 27% open. In other embodiments, each of the slot shaped holes may be curved slots.

The plurality of holes are preferably a cluster of holes, which may be arranged to form an array, matrix or pattern of holes in the tubular body.

The plurality of holes may be the same size. The plurality of holes may be equally spaced from each other.

In embodiments, where said at least one hole is a single hole, the hole is a complex hole, whereby the hole is neither a circle, nor an oval, nor a convex polygon, nor a linear slot. The complex hole can have a perimeter that includes at least one concave portion. The concave portion of the perimeter of the hole may be defined by a portion of the wall of the tubular body that projects into the transmission zone. The concave portion of the perimeter may have a vertex that has a reflex interior angle. Thus, the hole may be a concave polygon. The concave portion may have an irregular shape. At least part of the concave portion may be curved. By projecting into the transmission zone, the concave portion partially fills the transmission zone.

In other words, the transmission zone including a complex hole is not entirely devoid of the wall—it is only partially devoid of the wall at least because of said concave portion. The transmission zone may have an area defined by a perimeter that circumscribes outer perimeter points of the at least one hole, wherein no part of the perimeter is concave and wherein the perimeter is shaped such that the area of the transmission zone is minimized. In this context, the term concave is intended to be inclusive of reflex angled vertices, as opposed to only concave curves. In the case of there being a plurality of holes the outer perimeter points may belong to a subset of the plurality of holes.

In an embodiment, said transmission zone is transmissive to light. In an embodiment the transmission zone is alternatively, or more preferably additionally, transmissive to gas.

As will be appreciated the concave portion of the perimeter of the hole may thus make the transmission zone less open to transmission of light and/or gas. Being less transmissive to gas may advantageously mitigate any gas leakage through the tubular body that may be enabled by the hole.

In embodiments in which the single hole has at least one elongate opening, the elongate opening may be a gap in a portion of the wall. The elongate opening may include at least one bend. In one embodiment the elongate opening is shaped to form a spiral. The spiral may be formed by a single bend in the elongate opening, so as to form a circular spiral, or may have multiple bends in the same direction to form a square spiral. In other embodiments, the elongate opening has a plurality of bends in more than one direction. For example, the elongate opening may form a triangular wave, square wave, sawtooth wave, sinusoidal wave, or any other waveshape. The elongate opening may form a convoluted path in the wall, and the path may be irregular. The convoluted path may be periodic or non-periodic. In one embodiment the hole may comprise a plurality of said or other elongate openings. In one embodiment the hole is shaped as a star polygon wherein each arm of the star is an elongate opening. In one embodiment the hole is shaped as an asterisk.

Preferably, the mounting feature is a collar at a proximal end of the tube, the collar having a tapered abutment surface. In at least one embodiment, the abutment surface has a frustoconical contour.

The collar is preferably integral with the tubular body. The collar may be integral with the tubular body by being fixed to the tube body by bonding or being formed integrally with the tubular body.

For any of the aspects of the invention described herein, the tubular body may additionally include a further hole for transmitting light in a radial direction to a viewing position that is laterally beyond the tubular body. The further hole may have an area of between 5 and 10 mm$^2$, preferably between 6 and 9 mm$^2$, and more preferably between 7 and 8 mm$^2$. In one embodiment the hole has an area of 7.5 mm$^2$ In one version of the invention, the mounting feature projects from a proximal end of the tubular body and said region or transmission zone is in a distal half of the tubular body. In at least one embodiment, each of the one or more holes in the region or transmission zone is in a distal half of the tubular body. Preferably, in these cases, the region or transmission zone is in a portion of the open tubular body that radially surrounds said plasma. As used herein 'radially surrounding' a plasma is intended to mean that at least part of a plasma is within the tubular body, but the plasma may extend distally beyond a distal end of the tubular body.

In this version of the invention, the region or transmission zone enables transmission of at least light, and in some cases gas, through said one or more holes in the tubular body. Thus, the region or transmission zone is partially transmissive to light, wherein a percentage measure of light transmissibility may be equal to a percentage measure of an extent to which the region or transmission zone is devoid of said wall.

The transmission zone may span a length between 10 and 60 mm along the tubular body. The transmission zone may more specifically span a length between 15 and 25 mm along the tubular body. In one embodiment, the transmission zone spans approximately, or specifically, 20 mm along the tubular body.

In some embodiments, the transmission zone may span the circumference of the tubular body. However, in other embodiments the transmission zone spans a majority, but not all of the circumference. For example it may span about 90% of the circumference.

In this embodiment, the shape of the holes may be circular. The holes may be spaced such that there is one hole per square mm. The holes may have a diameter between 0.1 and 0.8 mm. This equates to the transmission zone being between about 1% and about 75% open. More preferably the holes have a diameter of between 0.2 and 0.6 mm. In one embodiment the holes have a diameter of 0.4 mm.

The holes may alternatively be slot shaped. In some embodiments, the slots have a width of 0.3 mm and a length of 20 mm. The slots may be spaced with equal spacing, wherein the spacing is in the range of 0.5 mm to 2 mm. In other embodiments the slots are sized and spaces so transmission zone is in the range of being about 15% open to about 50% open. In one embodiment, the slots are spaced every 1 mm. In one case, the transmission zone is 27% open.

In an embodiment, the tubular body includes a further hole for transmitting light from the plasma to a radially located viewing position, said further hole having a larger hole area than any of said at least one hole; and/or than any of the plurality of holes. Preferably said further hole is at positioned at a first longitudinal position along the tubular body, wherein the transmission zone spans between second and third longitudinal positions along the body, wherein the first longitudinal position is longitudinally between the second and third longitudinal positions.

In another version of the invention, the mounting feature projects from a proximal end of the tubular body and a portion of the open tubular body that radially surrounds said plasma is in a distal half of the tubular body. Preferably each of the one or more holes in the region or transmission zone is more proximally located than said portion of the open tubular body that radially surrounds said plasma. In at least one embodiment, each of the one or more holes in the region or transmission zone is in a proximal half of the tubular body.

In this embodiment, the region or transmission zone enables transmission of a gas, and preferably light, through said one or more holes in the tubular body. Thus, the region or transmission zone is partially transmissive to a gas, wherein a percentage measure of transmissibility to a gas may be equal to a percentage measure of an extent to which the region or transmission zone is devoid of said wall. By being partially transmissive to a gas, a spark may more readily be transmitted through the tubular body compared with the tubular body being non-transmissive to gas. This is particularly the case in embodiments in which the wall of the tubular body is an electrical insulator.

In one embodiment, the region or transmission zone may be circular. The region or transmission zone preferably spans an area of less than 100 square mm. In at least one embodiment, the region or transmission zone preferably spans less than 75 square mm, more preferably less than 50 square mm, more preferably less than 25 square mm, more preferably about or specifically 20 square mm.

In one embodiment, the region or transmission zone includes a plurality of holes arranged into a series of concentric circular arrays. Each circular array may include a plurality of circular holes that are equally spaced along a circumference of the circular array.

In some embodiments, the holes are sized and spaced so that the transmission zone is between 2% and 75% open. For example, the holes may have a diameter that is in the range of 0.05 to 0.8 mm, with 169 holes spread over an circular area that has a 4.5 mm diameter. The transmission zone may be more specifically between 5 and 30% open, or yet more specifically between 5 and 15%. In one example, the diameter is more specifically 0.1 mm, which results in the transmission zone being about 8% open.

In an embodiment, the tubular body includes a further hole for transmitting light from the plasma to a radially located viewing position, said further hole having a larger hole area than any of said at least one holes; and/or than any of the plurality of holes. Preferably said further hole is positioned at a longitudinal position that is more distally located than the region or transmission zone.

Further a tubular body according to the present invention may include both of the above versions of the invention. Accordingly, a tubular body may have a first of said region or transmission zone, and a second of said region or transmission zone. The first region/transmission zone may be in a distal half of the tubular body. Preferably the first and second region/transmission zone are longitudinally spaced from one another. The first region/transmission zone may be in a distal half of the tubular body and the second region/transmission zone may be in a proximal half of the tubular body.

For any of the embodiments described above, when the demountable tube is mounted in the plasma torch assembly, the tube is preferably an outer tube of the plasma torch assembly. The plasma torch assembly may have any of the features of the plasma torch assembly described herein.

A third aspect of the present invention provides a plasma torch assembly, such as an ICP torch assembly, having the demountable tube according to an embodiment of the first or second aspects of the invention. Thus, the demountable tube is preferably an outer tube of the torch assembly.

In at least one embodiment, the plasma torch assembly further comprises a base having an abutment surface having a complementary taper to said tapered abutment surface of said collar to locate the outer tube with respect to a further tube (eg a plasma tube) to provide a concentric alignment of the outer tube and further tube.

In at least one embodiment, the outer tube is de-mountable (ie removable) from the base. In at least one embodiment the plasma torch assembly further comprises a retainer for mounting the retainer to the base, with the collar being held between the retainer and the base.

A fourth aspect of the present invention provides a plasma torch assembly, such as an ICP torch assembly, comprising:
an open tubular body for radially surrounding a plasma within the tubular body, the tubular body comprising a wall, the tubular body extending distally from a base of the plasma torch assembly and being an outer tube of the plasma torch assembly;

wherein the tubular body has a transmission zone that is partially devoid of said wall and includes at least one hole through said wall.

A fifth aspect of the present invention provides a plasma torch assembly, such as an ICP torch assembly, comprising:

an open tubular body for radially surrounding a plasma within the tubular body, the tubular body comprising a wall, the tubular body extending distally from a base of the plasma torch assembly and being an outer tube of the plasma torch assembly;

wherein the tubular body includes a region that has either (i) a plurality of holes through the wall; or (ii) a single hole through the wall, wherein the single hole is either a complex hole or defines at least one elongate opening in the wall.

The tubular body in the plasma torch assembly of the fourth or fifth aspects of the present invention may have any of the features of the tubular body of the first or second aspect of the invention.

Preferably the plasma torch assembly of any aspect of the present invention comprises, in addition to said outer tube, a further tube (eg a plasma tube), the further tube being concentric with the outer tube and extending part way through a length of the outer tube. Preferably, the further tube extends through a proximal region of the outer tube, and in some embodiments through a majority of the length of the outer tube. However, the further tube has a distal tip that is more proximally located than a distal tip of the outer tube. In some embodiments, the region or transmission zone is located more distally than the distal tip of the further tube.

Preferably, the plasma torch assembly further comprises an inner tube that is concentric with said outer tube, said further tube being an intermediate tube between the inner tube and the outer tube. Preferably the inner tube extends through a proximal end of the intermediate tube. Preferably, the inner tube extends at least a majority of an overall length of the intermediate tube.

In embodiments where the tubular body includes a said region or a said transmission zone in a position that is more proximally located than the portion of the open tubular body that radially surrounds said plasma, the position is preferably more proximally located that the distal tip of said further tube.

In embodiments where the tubular body additionally or alternatively includes a said region or a said transmission zone in a position that is in a distal half of the outer tube, the position that is in a distal half of the outer tube is preferably more distally located than the distal tip of said further tube.

A further aspect of the present invention provides an ICP spectrometry system, such as a system for performing ICP mass spectrometry or ICP optical emission spectrometry, wherein the system includes a plasma torch assembly of the present invention and an RF coil for energising said plasma.

The RF coil may be more proximally located than the region or transmission zone, wherein said region or said transmission zone is for at least one of viewing and measuring a light intensity from the plasma that is radially surrounded by the outer tube.

The RF coil may alternatively be more proximally located than the region or transmission zone, wherein a said region or a said transmission zone is for assisting transmission of a spark for seeding the plasma. Preferably, the system further includes a Tesla coil that has a terminal that terminates at said region or transmission zone to provide said spark. Preferably the terminal has cross sectional area that is generally the same size as the area of said region or transmission zone that is for assisting transmission of a spark. The RF coil may be more distally located than the region or transmission zone that is for assisting transmission of a spark.

In some embodiments the RF coil may be between two of said regions/transmission zones that are separated from each other, wherein one of the regions/transmission zones is for spark transmission and one of the regions/transmission zones is for light transmission.

However, preferably the tubular body comprises, consists essentially of or consists of at least one refractory material, which is preferably a ceramic. In some embodiments the tubular body may comprise, consist essentially of or consist of at least one material having a melting point above 1000° C., 1100° C., 1200° C., 1300° C., 1400° C. or at least 1500° C. In some embodiments, the melting point is above 1250° C., such as about 1300° C. In some embodiments the refractory material has a working temperature (and therefore a melting point) greater than 1600 degrees Celsius.

However, preferably the tubular body comprises, consists essentially of or consists of at least one material, preferably a ceramic refractory material, having a melting point higher than the melting point of quartz, and is therefore greater than 1670° C. Thus, it is preferable that the tubular body has a melting point higher than the melting point of quartz. Preferably the melting point of the at least one material and/or the tubular body is at least 5% higher, 10% higher, 15% higher, 20% higher, 25% higher or more than the melting point of quartz. In some embodiments the at least one material has a working temperature (and therefore a melting point) greater than 2000 degrees Celsius.

The refractory material may comprise at least one of alumina, zirconia, yttria, ceria, silicon nitride or boron nitride.

Preferably the tubular body is electrically insulating. Thus, preferably the at least one material is an electrical insulator.

In some instances, the tubular body may consist of a ceramic that comprises, consists essentially of or consists of silicon nitride, wherein the tubular body has a melting temperature of around 1300 degree C.

In one embodiment the tubular body consists of "Sialon".

The tubular body is preferably made by a casting and sintering process.

In one embodiment the or each hole in the tubular body is made by a mechanical drilling process.

In various embodiments, the at least one material is opaque. Thus, in various embodiments, the wall is opaque. Therefore light can only be transmitted through the tubular body through the at least one hole.

In some embodiments the tubular body may comprise said at least one material and a further material, such as quartz, wherein the at least one material coats an internal surface, ie bore, of the tubular body.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
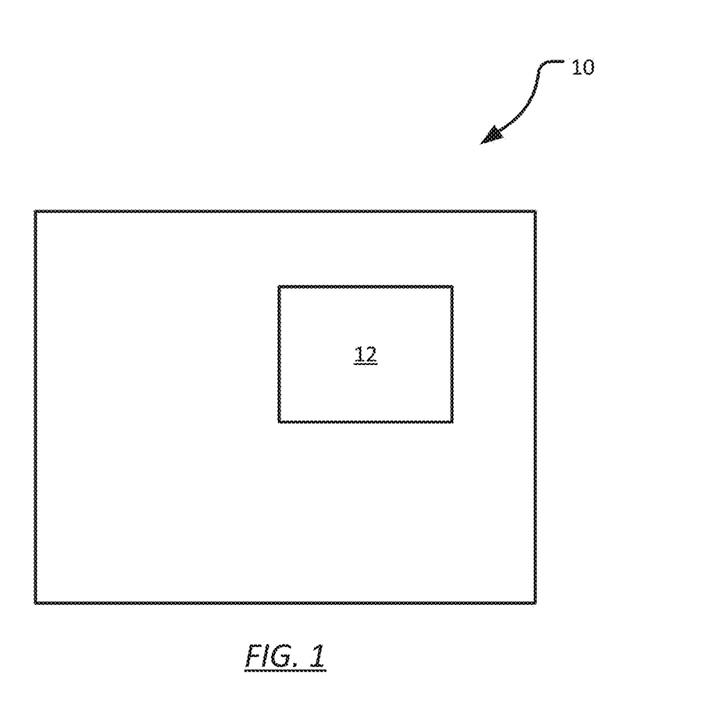
FIG. 1 is a block diagram showing an exemplary spectroscopy system in accordance with an aspect of the present invention.
Figure 2:
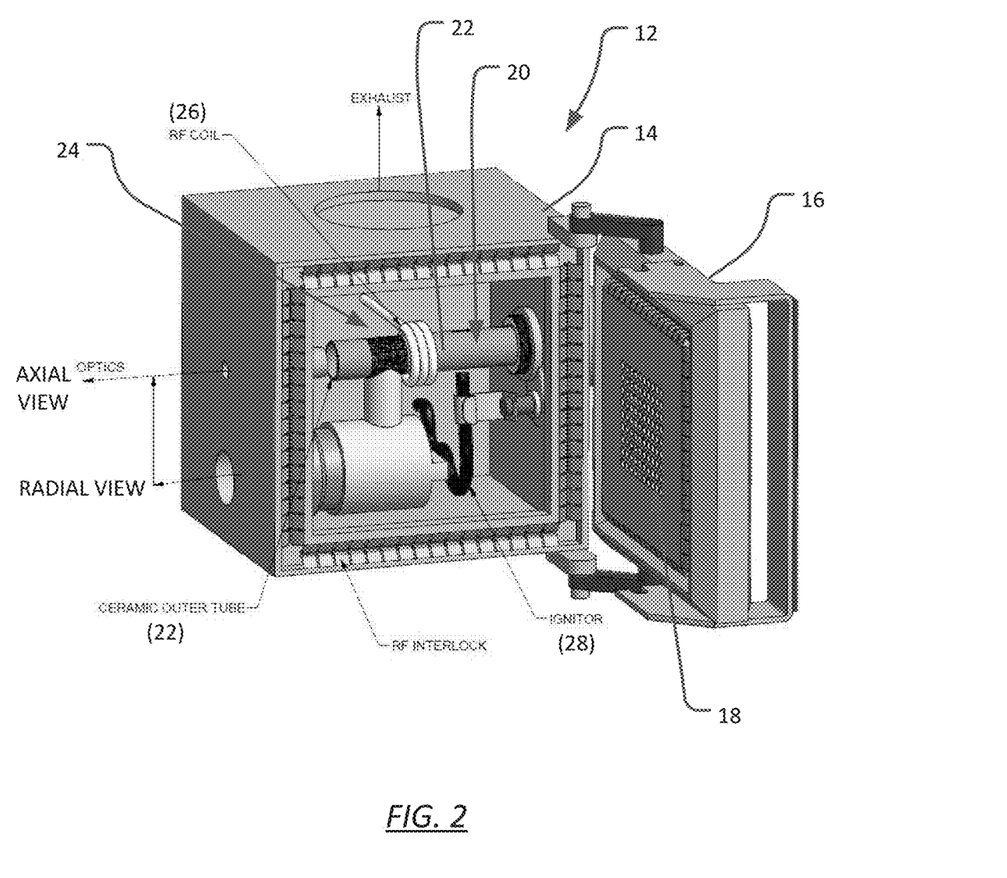
FIG. 2 is a perspective view of a torch box component of the spectroscopy system of FIG. 1, the torch box having an ICP torch assembly in accordance with an aspect of the present invention.

An exemplary spectroscopy system 10 is illustrated in FIG. 1. The system performs Mass Spectroscopy or Optical Emission Spectroscopy from a plasma generated in a plasma torch box 12. A perspective view of the plasma torch box 12 is illustrated in FIG. 2. The torch box includes an enclosure 14 having a door 16 which can be opened to access internal components within the torch box 12 or can be closed to form a radio frequency (RF) seal with the torch box enclosure 14. The door 16 includes a window 18 for viewing into the torch box 12. The enclosure holds an ICP torch assembly 20 which has a plurality of concentric tubes, including ceramic outer tube 22. The ceramic tubes may each consist of a silicon nitride, wherein each tube has a melting temperature of around 1300 degree C. The tubes extend into a cavity in the torch box 12. An aerosol sample from a nebuliser is injected through an inner tube of the torch assembly 20 and is formed into a plasma in a distal region 24 of the outer tube 22. The plasma is sustained by energy delivered from an RF coil 26 that loops around the outer tube 22. The plasma is seeded by electrons which are generated from an igniter 28 in the form of a Tesla coil. The Tesla coil terminates adjacent a spark transmission position 30 along the outer tube 22 to generate a spark which is transmitted through the outer tube 22 and then travels distally (but in a helical flow path), between an internal annulus of the outer tube 22 and an external surface of a middle tube (not shown in FIG. 2), towards RF coil 26. The energy provided by RF coil 26 results in a chain reaction of free-electron generation which ultimately results in the formation of a plasma in the distal region 24, beyond the distal tip of the middle tube.

Figure 3:
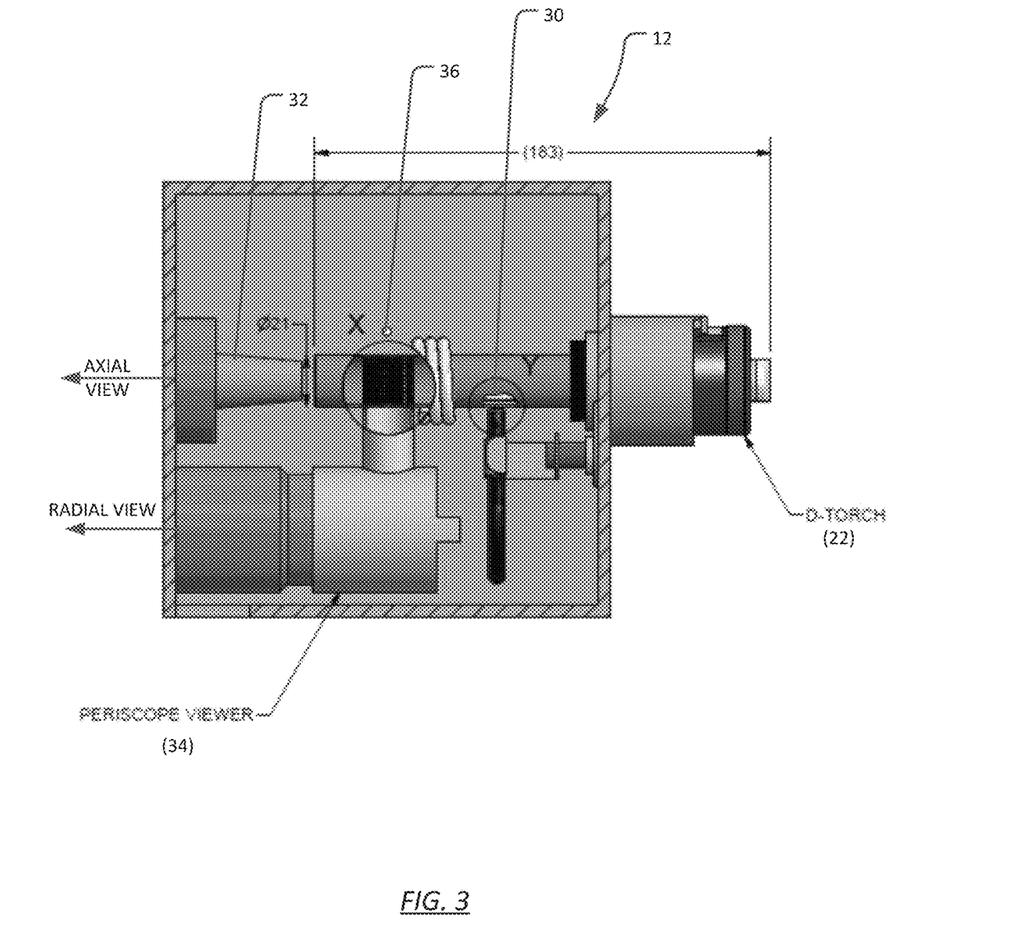
FIG. 3 is a side view of the a torch box component shown in FIG. 2.

Turning to FIG. 3, which shows a side view into the torch box 12, the plasma from the torch assembly 20 is received via a sample cone 32 to be analysed by a mass spectrometer or optical emission spectrometer. In the distal region of the outer tube 22, the plasma emits a great deal of electromagnetic radiation (more specifically light) at frequencies that are characteristic of the sample. A light sensor 36, mounted to a wall of the torch box 12 measures an intensity of light from the plasma in the torch box 12. A periscope viewer 34 is positioned for radial viewing of the plasma by the mass spectrometer or optical emission spectrometer. This complements the axial viewing of the plasma through the sample cone 32.

Figure 4:
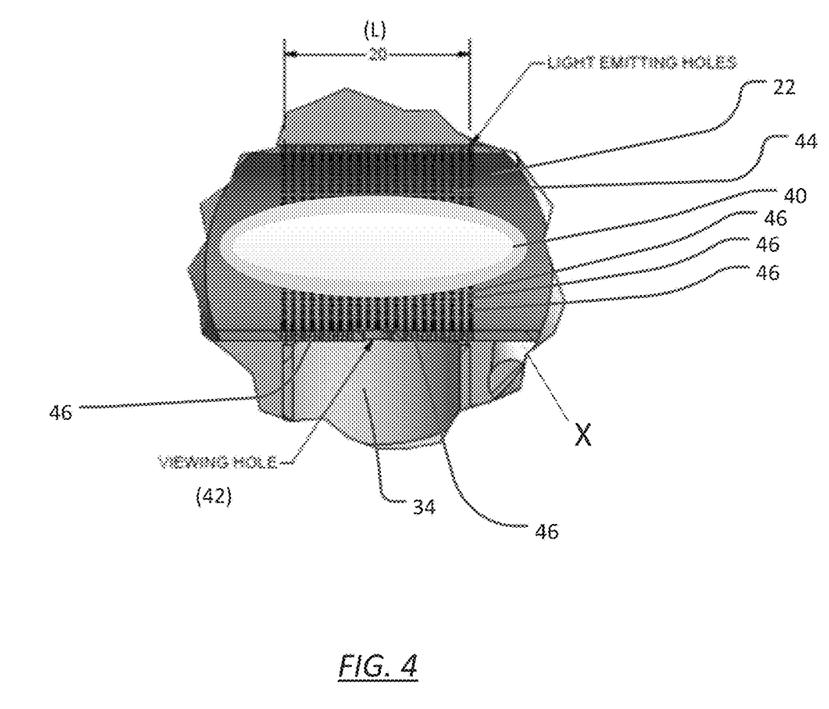
FIG. 4 is an expanded view of a portion of the ICP torch assembly in FIG. 2 that corresponds to a portion marked X in FIG. 3.

However, the outer tube 22 is comprised of an opaque ceramic, so certain features are included in the distal region of the outer tube 22 to enable light to be transmitted through the outer tube to the light sensor 36 and periscope viewer 34. FIG. 4 shows an expanded view of a part of the distal portion 24 of the torch assembly 20 with a cut-away region (marked X in FIGS. 3 and 4) to show a cross section of the torch where a light-emitting plasma 40 is radially surrounded by the outer tube 22.

The outer tube 22 includes a viewing hole 42, having a diameter of about 3 mm, for allowing transmission of the light-emitting plasma 40 through to the periscope viewer 34. The outer tube 22 also includes a transmission zone in the form of a multi-hole "viewing window" 44. The periscope viewer 34 is purged with argon gas to create a positive pressure in the periscope viewer to discourage leakage of gas from the outer tube 22 to the periscope 34 via the viewing hole 42. The viewing window 44 covers a region that includes an array of holes 46 that extend around the circumference of the outer tube 22 over a length L, such as 20 mm, to allow light from the plasma 40 to be transmitted through the outer tube and be received by light sensor 36. Each of the holes 46 is relatively small to ameliorate the potential for gas leakage through the holes 46. In the illustrated embodiment, each hole 46 has a diameter/area that is less than the diameter/area of the viewing hole 42. For example, each hole may have a diameter in the range of 0.1 mm to 0.8 mm. The holes are spaced from each other by 1 mm, so that there is one hole per square mm. By having a collection of holes, the collective light from the holes 46 emitted through the transmission zone provides a high enough light intensity to the light sensor 36 to determine whether the plasma is present, but by keeping each of the holes relatively small the potential for gas leakage is relatively low. Additionally, the close proximity of the holes to each other means that the holes collectively give the appearance of a "viewing window" in the torch through which a person, viewing the torch via torch box window 18, will be able to see at least part of the light-emitting plasma 40.

Figure 5:
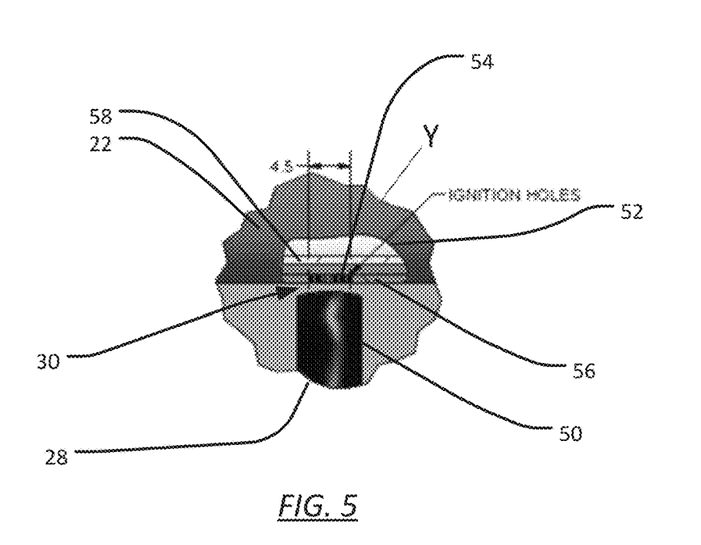
FIG. 5 is an expanded view of a portion of the ICP torch assembly in FIG. 2 that corresponds to a portion marked Y in FIG. 3.

FIG. 5 shows an expanded view of a part of the torch assembly 20 where a spark is transmitted through the outer tube 22. FIG. 5 illustrates the portion of the torch assembly 20 at the spark terminal 50 of the ignitor 28. For illustrative purposes, this Figure illustrates the torch assembly 20 with a cutaway portion 52 to show a cross-section of the torch at the spark transmission location 30 on the outer tube 22. At the spark transmission location 30 the outer tube 22 includes a zone or region 54 comprised of a plurality of holes to allow some transmission of gas through the tubular body 56 of the outer tube 22. This locally reduces the electrical impedance through the tubular body 56, so that an electric spark can more easily pass through the tubular body 56. By having transmissibility to gas, gaseous fluid at the location 30 may electrically break down to convey the spark through the tubular body 56. Once inside the outer tube 22, electrons from the spark travel along the outside of the middle tube 58 to seed the plasma 40, as has been described. To mitigate against undesirable gas leakage from the outer tube 22 out through the hole-containing zone, the overall area of the zone only covers the area of the outer tube at which a spark may be applied. For example, the area occupied by the zone may be less than 25 mm$^2$. In one embodiment, the zone is circular and has a diameter of 4.5 mm.

Figure 6:
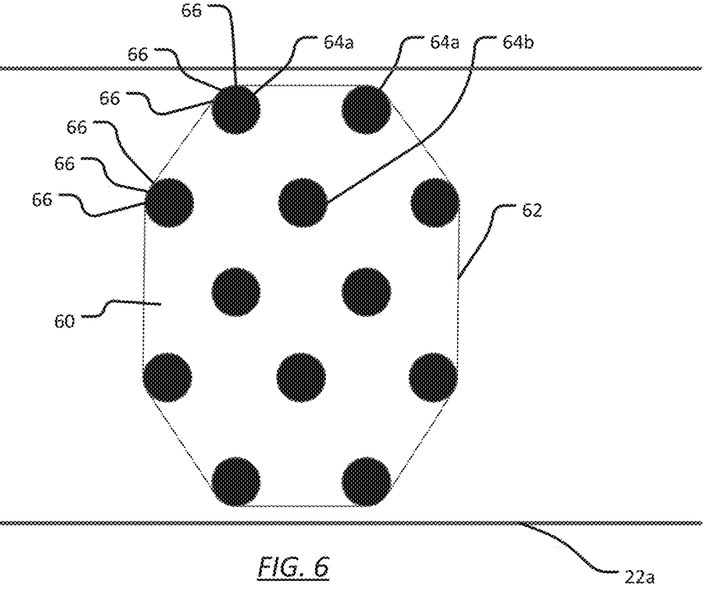
FIGS. 6 to 10 show embodiments of various transmission zones on an ICP torch that is in accordance an aspect of the present invention.

The concept of the transmission zone, whether it be in relation to transmission for a spark or for light, will now be discussed in further detail with reference to FIGS. 6 and 7. In FIG. 6, a tube 22b has a transmission zone 60. The transmission zone that has a perimeter 62 that envelops a plurality of holes 64(a,b). Some of the holes 64 have outer perimeter points 66 along an arch segment of the hole. Given that the segment is arcuate, the number of points 66 over the segment will, in a mathematical sense, approach infinity. The perimeter 62 of the transmission zone 60 circumscribes these outer points 66 but without having any portion of the perimeter being concave. Thus, the perimeter 62 touches outer holes 64a but not inner hole 64b. The perimeter of the transmission zone is shaped such that the area of the transmission zone is minimised. It will be appreciated, however, that that the perimeter 62 is a notional concept so does not require any form of physical demarcation on the outer tube. By having a plurality of holes 64, the transmission zone 60 is partially devoid of wall material, resulting in a proportion of the transmission zone being open. In the embodiment of FIG. 6, the transmission zone is less than 50% open. In this manner, there will be less gas leakage through the transmission zone 60 than were the transmission zone 60 entirely devoid of the wall.

Figure 7:
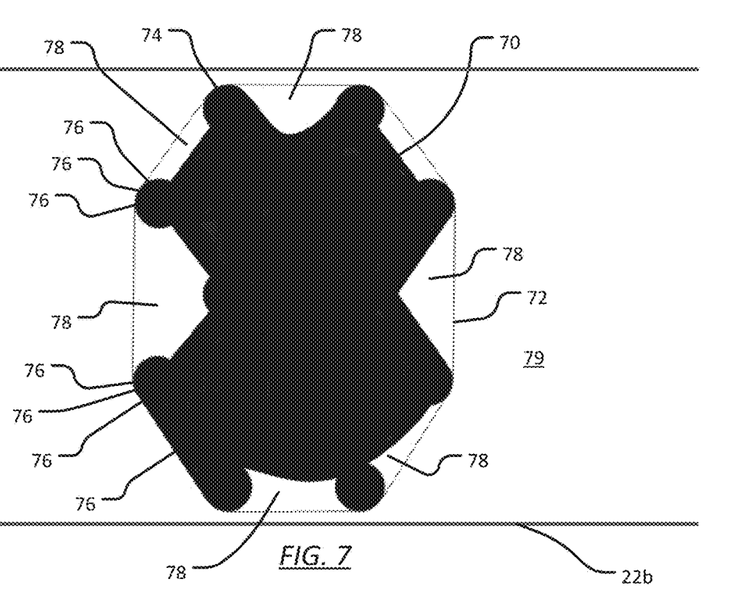

In another embodiment, shown in FIG. 7. A tube 22b has a transmission zone 70. Transmission zone 70 is defined by a perimeter 72 that has the same perimeter shape as perimeter 62 of transmission zone 60. However, in the case of transmission zone 70, the transmission zone includes only a single hole 74. The perimeter 72 circumscribes outer points 76. The perimeter 72 is shaped so that the area of the zone 70 is the minimum possible area without having any concave parts in the perimeter 72. The hole 74 has concave/inwardly protruding portion 78 in the sense of part of the tubular wall 79 extends into the transmission zone. Like in the case of transmission zone 60, transmission zone 70 is only partially devoid of wall material so that the area of the hole 74 is less than that of the transmission zone 70 to act against leakage of gas through the transmission zone 70. It will be appreciated that in both cases of FIGS. 6 and 7 the size of the hole(s) are exaggerated with respect to the size of the tubular body 22 for illustrative purposes.

Figure 8:
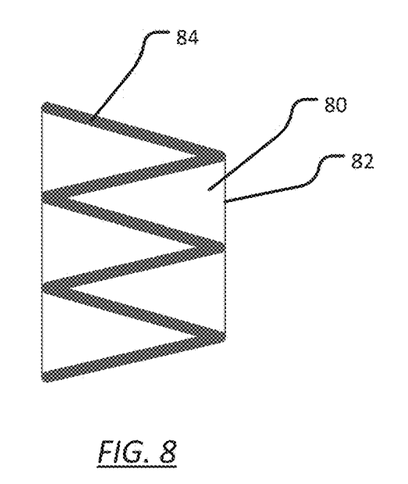
Figure 9:
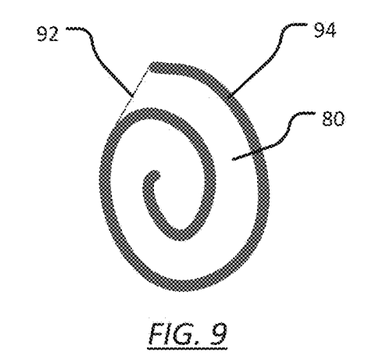
Figure 10:
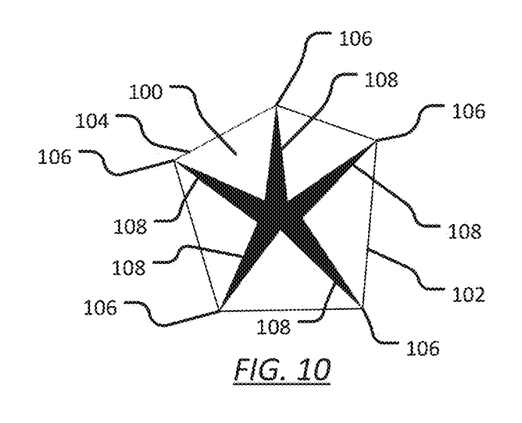

Further examples of transmission zones are illustrated in FIGS. 8-10. In FIG. 8, a transmission zone 80 having a perimeter 82 includes a triangular or zig-zag wave shape for hole 84. The hole in this case may be described as a single elongate hole.

In the case of the embodiment in FIG. 9, a transmission zone 90 having a perimeter 92 has a single elongate hole 94 saved as a spiral. The transmission zone in this case is ovoid apart from a small straight region. In the illustrated embodiment, the transmission zone has a trapezoidal shape.

In the embodiment in FIG. 10, a transmission zone 100 has a perimeter 102 transcribing points 106 of hole 104. The star-shaped hole 104 has elongate portions 108 being respective arms of the star. Each portion 108 defines a gap in a respective portion of a wall of the tubular body. In the illustrated embodiment, the perimeter 102 of the transmission zone 100 is a pentagon.

In another embodiment, rather than having a transmission zone circumscribing a hole whereby the transmission zone is only partially devoid of wall material, the zone is a single linear slot which, relative to a circular hole, may be less susceptible to gas leakage for a given level of transmissibility of light or a spark. In the case of the hole being a single linear slot, it will be appreciated that the transmission zone is fully devoid of wall.

The transmission zone of some embodiments of the present invention and/or the region of some embodiments of the invention may optionally be incorporated onto the outer tube of any of the plasma torch assemblies described in the U.S. Pat. No. 7,847,210 B2 which has been incorporated by reference.

The transmission zone of some embodiments of the present invention and/or the region of some embodiments of the invention may optionally be incorporated onto the outer tube or an outer tube of a ceramic plasma torch assembly manufactured by Australian company Glass Expansion Pty Limited located at 6 Central Boulevard, Port Melbourne VIC 3207. For example the outer tube may be part number 31-808-3694, and the plasma torch assembly may be a part number 30-808-2844 as available in December 2016 in Glass Expansion Pty Limited's range of D-Torch Demountable Torches.

Figure 11:
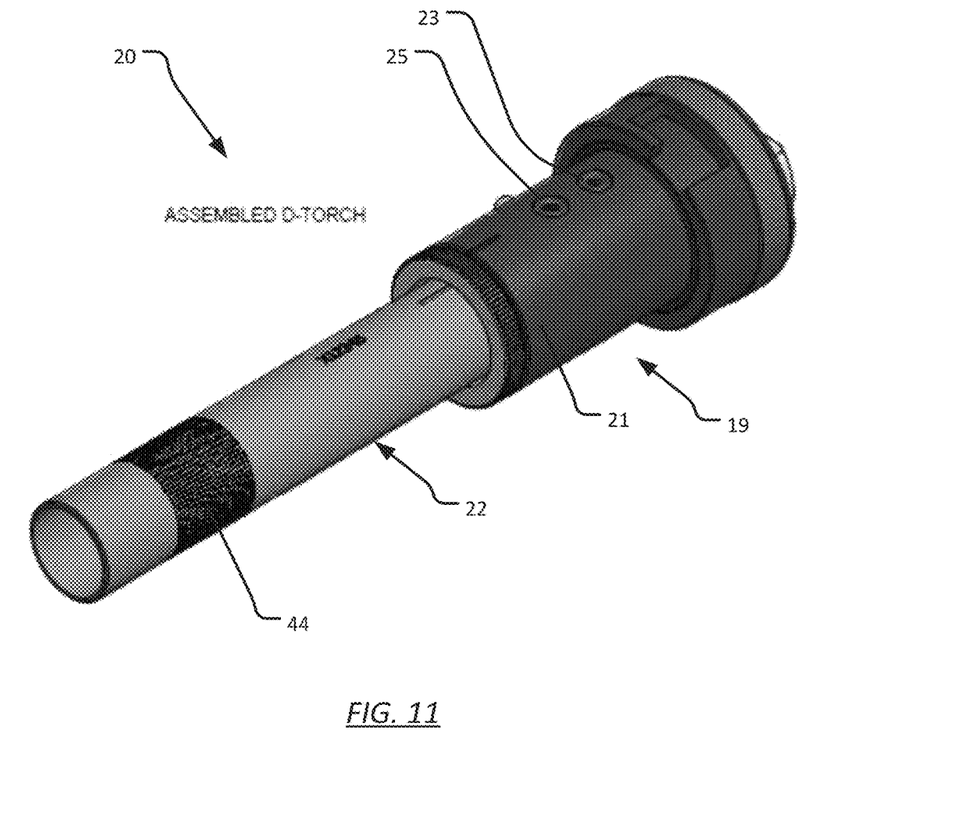
FIG. 11 shows a perspective view of the ICP torch assembly in FIG. 2.

A perspective view of a torch assembly in FIGS. 2 to 5 is shown in FIG. 11. The torch assembly 20 has a torch body assembly 19 having a base 21. The base 21 has inlet holes 23 and 25 for receiving plasma gas and coolant gas respectively. The outer tube 22, having a first transmission zone in the form of window 44 projects distally from the torch body assembly 21.

Figure 12:
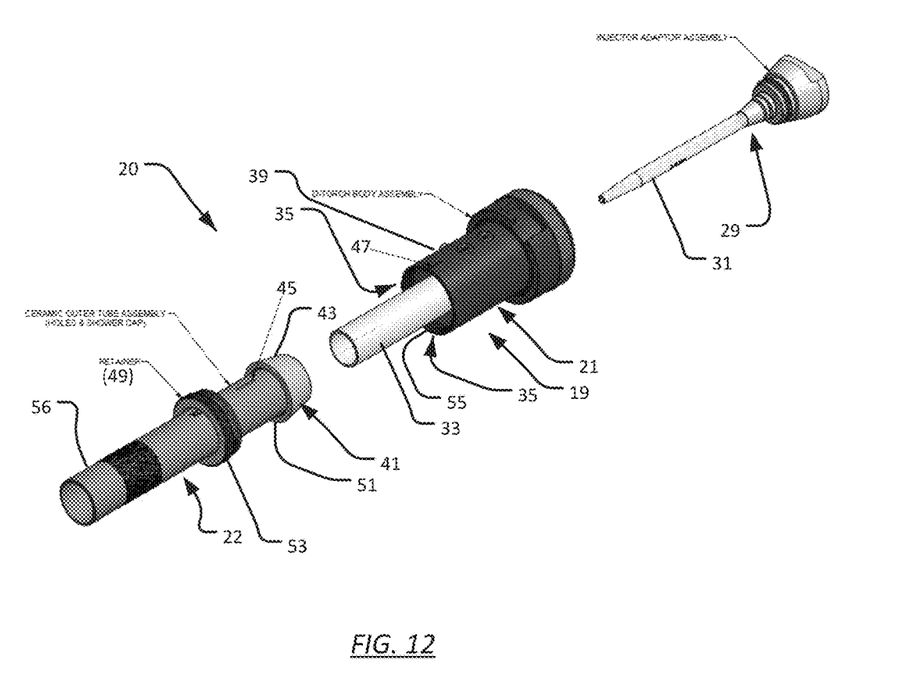
FIG. 12 shows an exploded view of the ICP torch assembly of FIG. 11.

An exploded view of torch assembly 20 is illustrated in FIG. 12. The base 21 has an opening 27 in its proximal end for receiving an injector adaptor assembly 29, which includes an inner tube 31 injecting nebulised sample. The base 21 also includes a middle tube 33, which extends distally from a circular housing 35 in the base 21. An annular opening 37 exists between the middle tube 33 and a cylindrical wall 39 of the housing 35.

The outer tube 22, having the tubular body 56, also has an annular collar 41 that projects outwardly from a proximal end of the tubular body 56. The collar 41 has a tapered abutment surface 43 having a frustoconical contour, and the distal side of the collar has a flanged surface 51 that is perpendicular to the longitudinal axis of the tubular body 56. To mount the outer tube 22 to the torch body assembly, the collar 41 is inserted into the annular opening 37 in the torch body 19. The base 21 has an abutment surface (not shown) in the housing 35 that has a complementary taper to the tapered abutment surface 43 of the collar 41 to locate the tubular body 56 tube with respect to the middle tube 33 to provide a concentric alignment of the tubular body 56 and the middle tube 33. The outer tube 22 also includes a marking 45 on the tubular body 56 to set a rotational alignment of the tubular body 56 with respect to the base 21 by aligning the marking 45 with a corresponding marking 47 on the base 21. Once in place, a ring-shaped retainer 49 around the tubular body 56 is secured to the base 21 via an interaction of threads 53 on the retainer and threads 55 on an internal surface of the cylindrical wall 39 of the housing 35. When screwed into position, the retainer 49 blocks the removal of the outer tube 22 by abutting against the flange 51 of the collar 41 of the outer tube 22. By unscrewing the retainer 49 the outer tube 22 may be replaced.

Figure 13:
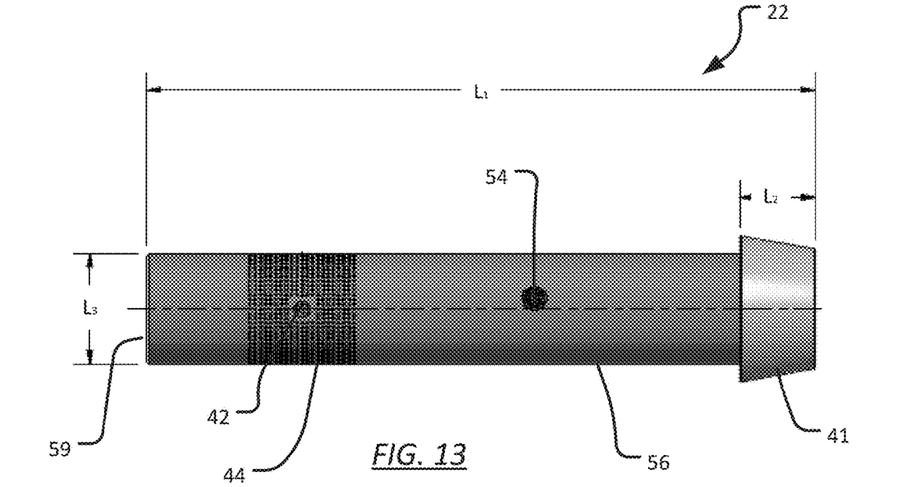
FIG. 13 shows a side view of an outer tube removed from the ICP torch assembly of FIGS. 11 and 12, the outer tube having a first transmission zone and a second transmission zone.

A side view of the outer tube 22 is shown in FIG. 13. While the dimension of the outer tube may vary, in the illustrated embodiment, the overall length $L_1$ of the outer tube 22 is about 128 mm; the collar 41 has a length $L_2$ of about 14 mm; and the outer tube has an outer diameter $L_3$ of about 21 mm and an inner diameter of about 19 mm. The viewing hole 42, comprised of a plurality of circular holes 46, has a centre that is about 30 mm from the distal tip 59 of the tubular body 56. The viewing window 44 has a length of about 20 mm, with the viewing hole 42 being located in longitudinal centre of the viewing window 44. The tubular body has a second transmission zone 54 having a centre about 74 mm from the distal tip 59 of the tubular body 56, for facilitating spark transmission through the tubular body 56.

Figure 14:
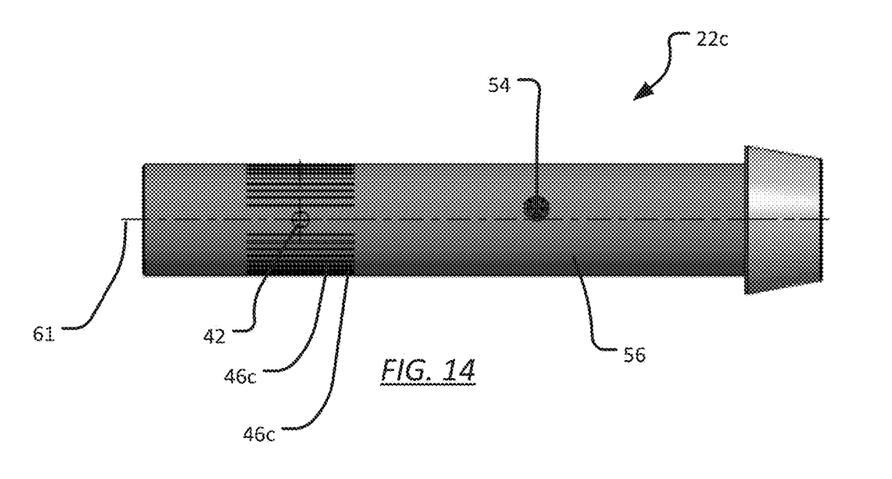
FIG. 14 shows a side view of a variant of the outer tube shown in FIG. 13, having a different embodiment of the first transmission zone.

FIG. 14 shows another embodiment of a tubular body 22c which is the same as tubular body 22 except that instead of having a plurality of circular holes, the viewing window 44c in this case has an array of parallel linear slots 46c. In this embodiment, each of the slots has a longitudinal axis that is substantially parallel with the longitudinal axis 61 of the tubular body 56. Each of the slots has a width that is less than the diameter (width) of the viewing hole 42. However, the length of each slot is longer than the diameter of the viewing hole 42.

Figure 15:
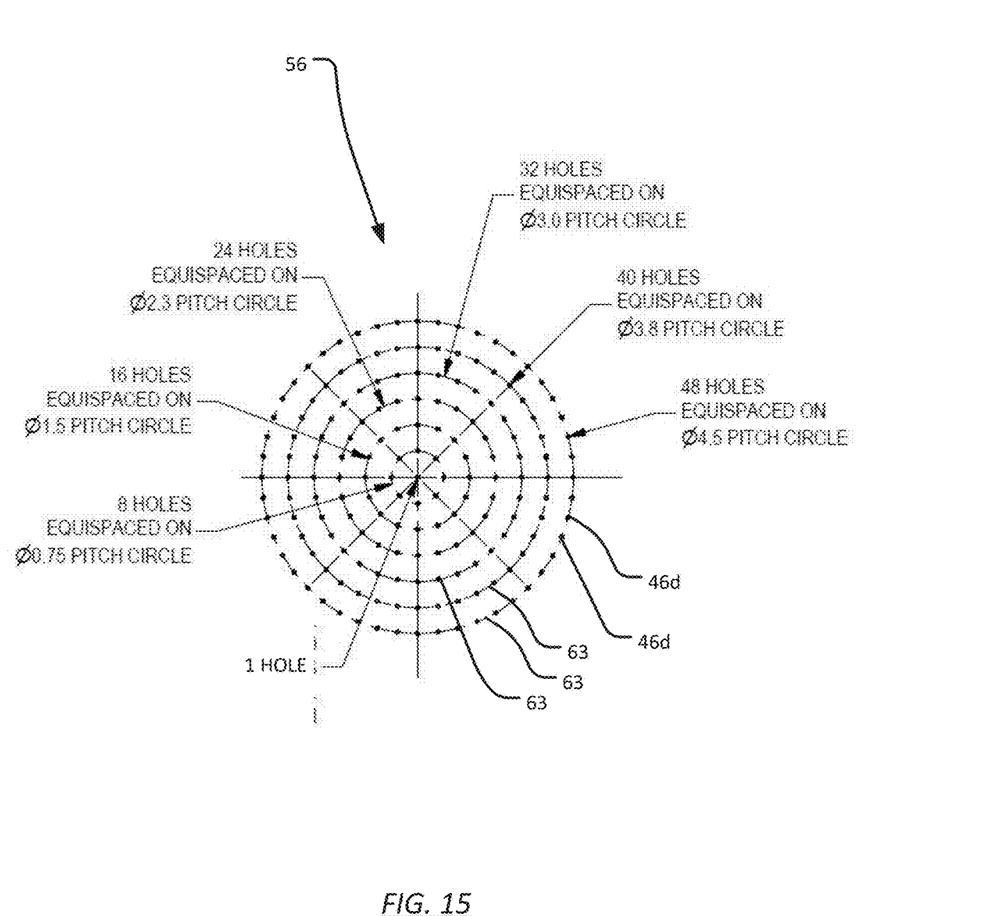
FIG. 15 shows a view of the second transmission zone on the outer tube of FIG. 13 and on the outer tube of FIG. 14.

An enlarged view of the second transmission zone 56 in FIGS. 13 and 14 is illustrated in FIG. 15. The transmission zone 56 has a plurality of holes 46d arranged into a series of concentric circular arrays 63. In each circular array, the holes 46d in the circular array are spaced along a circumference of the circular array. In the illustrated embodiment, there are 6 concentric circular arrays and a central hole. The respective arrays have: 48 holes spaced along the circumference of a 4.5 mm diameter circle; 40 holes spaced along the circumference of a 3.8 mm diameter circle; 32 holes spaced along the circumference of a 3.0 mm diameter circle; 24 holes spaced along the circumference of a 2.3 mm diameter circle; 16 holes spaced along the circumference of a 1.5 mm diameter circle; and 8 holes spaced along the circumference of a 0.75 mm diameter circle. Each of the holes has a diameter of 0.1 mm.

In various embodiments the mounting feature includes a tapered surface to control the alignment, the tapered surface being on a collar that is integral with the outer tube at a proximal end of the outer tube.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A demountable tube for a plasma torch assembly, the tube comprising:
   an open tubular body for radially surrounding a plasma within the tubular body, the tubular body comprising a wall; and
   a mounting feature projecting from the tubular body for at least one of: (i) controlling alignment of the tubular body with respect to a mounting portion of a plasma torch assembly, and (ii) releasably securing the tubular body to a portion of the plasma torch assembly;
   wherein the tubular body has a transmission zone that includes a plurality of holes through said wall; and
   wherein the open tubular body is opaque.

2. A demountable tube for a plasma torch as claimed in claim 1 wherein the mounting feature projects from a proximal end of the tubular body.

3. A demountable tube for a plasma torch as claimed claim 1 wherein said transmission zone is in a distal half of the tubular body.

4. A demountable tube for a plasma torch assembly as claimed in claim 1 which includes a further hole arranged for transmitting light in a radial direction to a viewing position that is laterally beyond the tubular body said further hole being at a distal end of said tubular body.

5. A demountable tube for a plasma torch as claimed in claim 1 wherein a portion of the open tubular body radially surrounds said plasma is in a distal half of the tubular body, wherein the transmission zone is more proximally located than said portion of the open tubular body that radially surrounds said plasma.

6. A demountable tube for a plasma torch as claimed in claim 1 wherein the transmission zone comprises a viewing window to enable at least part of the plasma to be seen, or for assisting transmission of a spark for seeding the plasma.

7. A demountable tube for a plasma torch as claimed in claim 1 which includes a second transmission zone, wherein said second transmission zone includes at least one hole through said wall.

8. A demountable tube for a plasma torch assembly, the tube comprising:
   an open tubular body for radially surrounding a plasma within the tubular body, the tubular body comprising a wall; and
   a mounting feature projecting from the tubular body for at least one of: (i) controlling alignment of the tubular body with respect to a mounting portion of a plasma torch assembly, and (ii) releasably securing the tubular body to a portion of the plasma torch assembly;
   wherein the tubular body includes a region that has a plurality of holes through the wall; and
   wherein the open tubular body is opaque.

9. A demountable tube for a plasma torch as claimed in claim 8 wherein the region comprises a viewing window to enable at least part of the plasma to be seen, or for assisting transmission of a spark for seeding the plasma.

10. A demountable tube for a plasma torch as claimed in claim 8 which includes a second region, said second region having at least one hole through the wall.

11. A plasma torch assembly having the demountable tube as claimed in claim 1.

12. A plasma torch assembly as claimed in claim 11 wherein the tubular body is the outer tube of the plasma torch assembly.

13. A plasma torch assembly having the demountable tube as claimed in claim 8.

14. A plasma torch assembly as claimed in claim 13 wherein the tubular body is the outer tube of the plasma torch assembly.

15. A plasma torch assembly comprising:
   an open tubular body for radially surrounding a plasma within the tubular body, the tubular body comprising a wall, the tubular body extending distally from a base of the plasma torch assembly and being an outer tube of the plasma torch assembly;
   wherein the tubular body has a transmission zone that includes a plurality of holes through said wall; and
   wherein the open tubular body is opaque.

16. A plasma torch assembly comprising:
   an open tubular body for radially surrounding a plasma within the tubular body, the tubular body comprising a wall, the tubular body extending distally from a base of the plasma torch assembly and being an outer tube of the plasma torch assembly;

wherein the tubular body includes a region that has a plurality of holes through the wall; and wherein the open tubular body is opaque.

17. The plasma torch assembly as claimed in claim 15 wherein the transmission zone comprises a viewing window to enable at least part of the plasma to be seen, or a window for assisting transmission of a spark for seeding plasma.

18. The plasma torch assembly as claimed in claim 15 which includes a second transmission zone, said second transmission zone includes at least one hole through said wall.

19. The plasma torch assembly as claimed in claim 18 wherein the region comprises a viewing window to enable at least part of the plasma to be seen, or a window for assisting transmission of a spark for seeding the plasma.

20. The plasma torch assembly as claimed in claim 18 which includes a second region, said second region having at least one hole through the wall.

* * * * *

UNITED STATES PATENT AND TRADEMARK OFFICE
CERTIFICATE OF CORRECTION

PATENT NO. : 10,390,417 B2
APPLICATION NO. : 15/836544
DATED : August 20, 2019
INVENTOR(S) : Brezni et al.

Page 1 of 1

It is certified that error appears in the above-identified patent and that said Letters Patent is hereby corrected as shown below:

In the Specification

Column 1, Line 13, change "torches torches" to --torches--.

Column 2, Line 60, before "a" delete "and".

Column 3, Line 11, before "a" delete "and".

Column 3, Line 38, after "each" insert --of--.

Column 9, Line 10, change "the a" to --the--.

Column 11, Line 26, change "that that" to --that--.

In the Claims

Column 14, Line 4, in Claim 3, after "claimed" insert --in--.

Signed and Sealed this
Fifth Day of May, 2020

Andrei Iancu
*Director of the United States Patent and Trademark Office*